(12) United States Patent
Grangier et al.

(10) Patent No.: US 11,887,623 B2
(45) Date of Patent: Jan. 30, 2024

(54) END-TO-END SPEECH DIARIZATION VIA ITERATIVE SPEAKER EMBEDDING

(71) Applicant: Google LLC, Mountain View, CA (US)

(72) Inventors: David Grangier, Mountain View, CA (US); Neil Zeghidour, Mountain View, CA (US); Oliver Teboul, Mountain View, CA (US)

(73) Assignee: Google LLC, Mountain View, CA (US)

(*) Notice: Subject to any disclaimer, the term of this patent is extended or adjusted under 35 U.S.C. 154(b) by 9 days.

(21) Appl. No.: 17/304,514

(22) Filed: Jun. 22, 2021

(65) Prior Publication Data

US 2022/0375492 A1 Nov. 24, 2022

Related U.S. Application Data

(60) Provisional application No. 63/187,336, filed on May 11, 2021.

(51) Int. Cl.
*G10L 25/78* (2013.01)
*G06N 3/04* (2023.01)
*G10L 15/06* (2013.01)
*G10L 15/07* (2013.01)
*G10L 17/18* (2013.01)
*G10L 19/008* (2013.01)

(52) U.S. Cl.
CPC ............... *G10L 25/78* (2013.01); *G06N 3/04* (2013.01); *G10L 15/063* (2013.01); *G10L 15/07* (2013.01); *G10L 17/18* (2013.01); *G10L 19/008* (2013.01)

(58) Field of Classification Search
CPC ......... G10L 17/00; G10L 17/02; G10L 17/04; G10L 17/06; G10L 17/18; G10L 15/063; G10L 15/07; G10L 25/51; G10L 25/78; G10L 19/008
See application file for complete search history.

(56) References Cited

U.S. PATENT DOCUMENTS

| | | | |
|---|---|---|---|
| 2018/0342245 A1* | 11/2018 | Sugiura | G10L 15/26 |
| 2019/0318743 A1* | 10/2019 | Reshef | G10L 25/78 |
| 2020/0043508 A1* | 2/2020 | Song | G10L 25/30 |
| 2020/0175961 A1* | 6/2020 | Thomson | G10L 15/28 |
| 2022/0044687 A1* | 2/2022 | Perret | G06N 3/049 |

* cited by examiner

*Primary Examiner* — Daniel C Washburn
*Assistant Examiner* — Paul J. Mueller
(74) *Attorney, Agent, or Firm* — Honigman LLP; Brett A. Krueger; Grant J. Griffith

(57) ABSTRACT

A method includes receiving an input audio signal corresponding to utterances spoken by multiple speakers. The method also includes encoding the input audio signal into a sequence of T temporal embeddings. During each of a plurality of iterations each corresponding to a respective speaker of the multiple speakers, the method includes selecting a respective speaker embedding for the respective speaker by determining a probability that the corresponding temporal embedding includes a presence of voice activity by a single new speaker for which a speaker embedding was not previously selected during a previous iteration and selecting the respective speaker embedding for the respective speaker as the temporal embedding. The method also includes, at each time step, predicting a respective voice activity indicator for each respective speaker of the multiple speakers based on the respective speaker embeddings selected during the plurality of iterations and the temporal embedding.

26 Claims, 6 Drawing Sheets

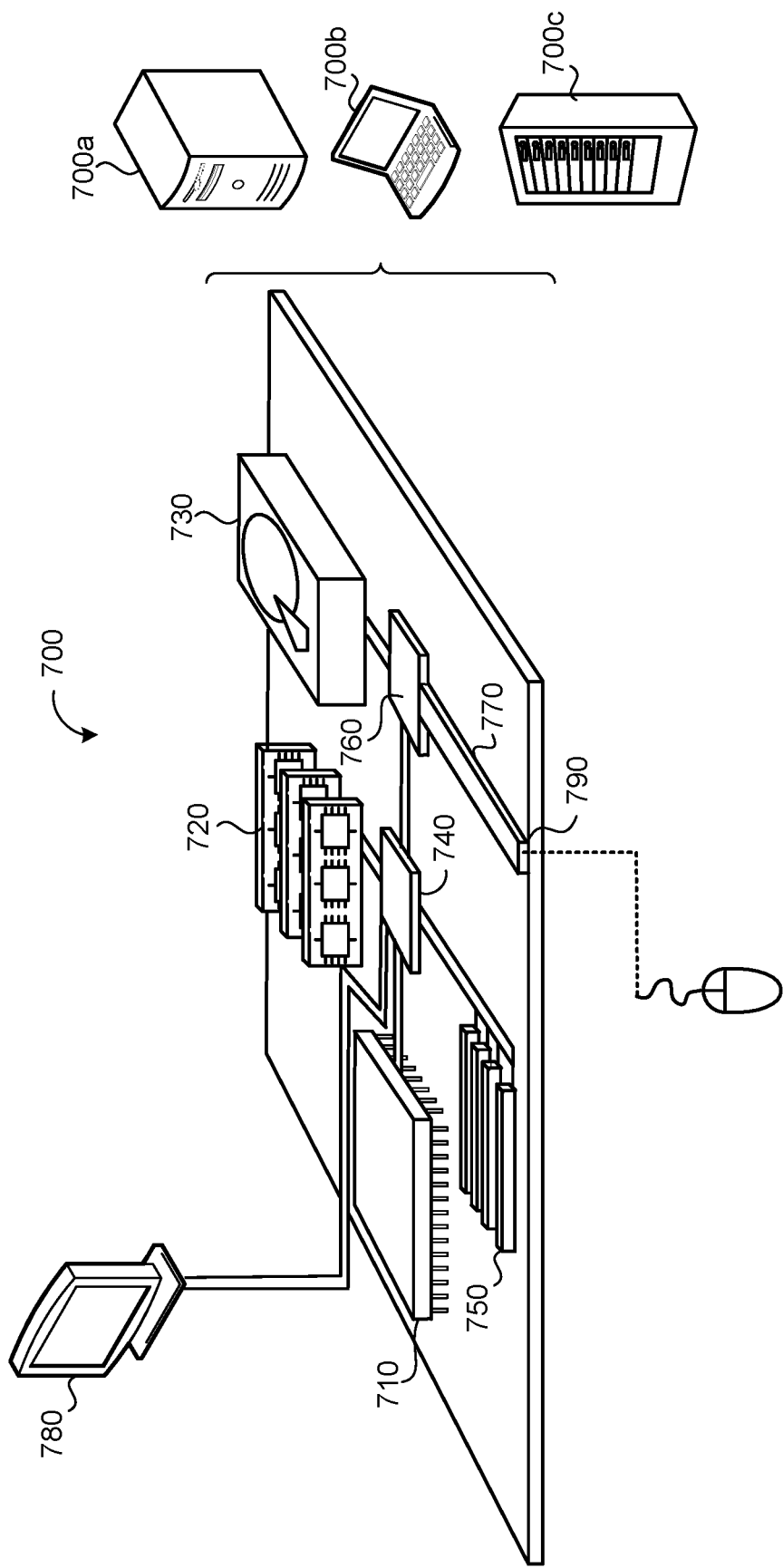

END-TO-END SPEECH DIARIZATION VIA ITERATIVE SPEAKER EMBEDDING

CROSS REFERENCE TO RELATED APPLICATIONS

This U.S. Patent Application claims priority under 35 U.S.C. § 119(e) to U.S. Provisional Application 63/187,336, filed on May 11, 2021. The disclosure of this prior application is considered part of the disclosure of this application and is hereby incorporated by reference in its entirety.

TECHNICAL FIELD

This disclosure relates to end-to-end speaker diarization via iterative speaker embedding.

BACKGROUND

Speaker diarization is the process of partitioning an input audio stream into homogenous segments according to speaker identity. In an environment with multiple speakers, speaker diarization answers the question "who is speaking when" and has a variety of applications including multimedia information retrieval, speaker turn analysis, audio processing, and automatic transcription of conversational speech to name a few. For example, speaker diarization involves the task of annotating speaker turns in a conversation by identifying that a first segment of an input audio stream is attributable to a first human speaker (without particularly identifying who the first human speaker is), a second segment of the input audio stream is attributable to a different second human speaker (without particularly identifying who the second human speaker is), a third segment of the input audio stream is attributable to the first human speaker, etc.

SUMMARY

One aspect of the disclosure provides a computer-implemented method that when executed on data processing hardware causes the data processing hardware to perform operations. The operations include receiving an input audio signal that corresponds to utterances spoken by multiple speakers. The operations also include encoding the input audio signal into a sequence of T temporal embeddings. Each temporal embedding is associated with a corresponding time step and represents speech content extracted from the input audio signal at the corresponding time step. During each of a plurality of iterations each corresponding to a respective speaker of the multiple speakers, the operations include selecting a respective speaker embedding for the respective speaker. For each temporal embedding in the sequence of T temporal embeddings, the operations select the respect speaker embedding by determining a probability that the corresponding temporal embedding includes a presence of voice activity by a single new speaker for which a speaker embedding was not previously selected during a previous iteration. The operations also select the respective speaker embedding by selecting the respective speaker embedding for the respective speaker as the temporal embedding in the sequence of T temporal embeddings associated with the highest probability for the presence of voice activity by the single new speaker. At each time step, the operations also include, predicting a respective voice activity indicator for each respective speaker of the multiple speakers based on the respective speaker embeddings selected during the plurality of iterations and the temporal embedding associated with the corresponding time step. The respective voice activity indicator indicates whether a voice of the respective speaker is active or inactive at the corresponding time step.

Implementations of the disclosure may include one or more of the following optional features. In some implementations, at least a portion of the utterances in the received input audio signal are overlapping. In some examples, a number of the multiple speakers is unknown when the input audio signal is received. The operations may further include, while encoding the input audio signal, projecting the sequence of T temporal embeddings encoded from the input audio signal to a downsampled embedding space.

In some implementations, during each of the plurality of iterations for each temporal embedding in the sequence of temporal embeddings, determining the probability that the corresponding temporal embedding includes the presence of voice activity by the single new speaker includes determining a probability distribution of possible event types for the corresponding temporal embedding. The possible event types include the presence of voice activity by the single new speaker, a presence of voice activity for a single previous speaker for which another respective speaker embedding was previously selected during a previous iteration, a presence of overlapped speech, and a presence of silence. In these implementations, determining the probability distribution of possible event types for the corresponding temporal embedding may include: receiving, as input to a multi-class linear classifier with a fully-connected network, the corresponding temporal embedding and a previously selected speaker embedding that includes an average of each respective speaker embedding previously selected during previous iterations; and mapping, using the multi-class linear classifier with the fully-connected network, the corresponding temporal embedding to each of the possible event types. The multi-class linear classifier may be trained on a corpus of training audio signals that are each encoded into a sequence of training temporal embeddings. Here, each training temporal embedding includes a respective speaker label.

In some examples, during each iteration subsequent to an initial iteration, determining the probability that the corresponding temporal embedding includes the presence of voice activity by the single new speaker is based on each other respective speaker embedding previously selected during each iteration prior to the corresponding iteration. In some implementations, during each of the plurality of iterations, the operations further include determining whether the probability for the corresponding temporal embedding in the sequence of temporal embeddings that is associated with the highest probability for the presence of voice activity by the single new speaker satisfies the confidence threshold. Here, selecting the respective speaker embedding is conditioned on the probability for the corresponding temporal embedding in the sequence of temporal embeddings that is associated with the highest probability for the presence of voice activity by the single new speaker that satisfies the confidence threshold. In these implementations, during each of the plurality of iterations, the operations may further include bypassing selection of the respective speaker embedding during the corresponding iteration when the probability for the corresponding temporal embedding in the sequence of temporal embeddings that is associated with the highest probability for the presence of voice activity by the single new speaker fails to satisfy the confidence threshold. Optionally, after bypassing selection of the respective speaker embedding during the corresponding iteration, the operations may further include determining a number N of the multiple speakers based on the number of speaker embeddings previously selected during the iterations prior to the corresponding iteration.

Predicting the respective voice activity indicator for each respective speaker of the multiple speakers at each time step may be based on the temporal embedding associated with the corresponding time step, the respective speaker embedding selected for the respective speaker, and a mean of all the speaker embeddings selected during the plurality of iterations. In some examples, predicting the respective voice activity indicator for each respective speaker of the multiple speakers at each time step includes using a voice activity detector having parallel first and second fully-connected neural networks. In these examples, the first fully-connected neural network of the voice activity detector is configured to project the temporal embedding associated with the corresponding time step, and the second fully-connected neural network of the voice activity detector is configured to project a concatenation of the respective speaker embedding selected for the respective speaker and a mean of all the speaker embedding selected during the plurality of iterations.

A training process may train the voice activity indicator on a corpus of training audio signals that are each encoded into a sequence of temporal embeddings. Here, each temporal embedding includes a corresponding speaker label. Optionally, the training process may include a collar-aware training process that removes losses associated with any of the training temporal embeddings that fall inside a radius around speaker turn boundaries.

Another aspect of the disclosure provides a system that includes data processing hardware and memory hardware storing instructions that when executed on the data processing hardware cause the data processing hardware to perform operations. The operations include receiving an input audio signal that corresponds to utterances spoken by multiple speakers. The operations also include encoding the input audio signal into a sequence of T temporal embeddings. Each temporal embedding is associated with a corresponding time step and represents speech content extracted from the input audio signal at the corresponding time step. During each of a plurality of iterations each corresponding to a respective speaker of the multiple speakers, the operations include selecting a respective speaker embedding for the respective speaker. For each temporal embedding in the sequence of T temporal embeddings, the operations select the respect speaker embedding by determining a probability that the corresponding temporal embedding includes a presence of voice activity by a single new speaker for which a speaker embedding was not previously selected during a previous iteration. The operations also select the respective speaker embedding by selecting the respective speaker embedding for the respective speaker as the temporal embedding in the sequence of T temporal embeddings associated with the highest probability for the presence of voice activity by the single new speaker. At each time step, the operations also include, predicting a respective voice activity indicator for each respective speaker of the multiple speakers based on the respective speaker embeddings selected during the plurality of iterations and the temporal embedding associated with the corresponding time step. The respective voice activity indicator indicates whether a voice of the respective speaker is active or inactive at the corresponding time step.

Implementations of the disclosure may include one or more of the following optional features. In some implementations, at least a portion of the utterances in the received input audio signal are overlapping. In some examples, a number of the multiple speakers is unknown when the input audio signal is received. The operations may further include, while encoding the input audio signal, projecting the sequence of T temporal embeddings encoded from the input audio signal to a downsampled embedding space.

In some implementations, during each of the plurality of iterations for each temporal embedding in the sequence of temporal embeddings, determining the probability that the corresponding temporal embedding includes the presence of voice activity by the single new speaker includes determining a probability distribution of possible event types for the corresponding temporal embedding. The possible event types include the presence of voice activity by the single new speaker, a presence of voice activity for a single previous speaker for which another respective speaker embedding was previously selected during a previous iteration, a presence of overlapped speech, and a presence of silence. In these implementations, determining the probability distribution of possible event types for the corresponding temporal embedding may include: receiving, as input to a multi-class linear classifier with a fully-connected network, the corresponding temporal embedding and a previously selected speaker embedding that includes an average of each respective speaker embedding previously selected during previous iterations; and mapping, using the multi-class linear classifier with the fully-connected network, the corresponding temporal embedding to each of the possible event types. The multi-class linear classifier may be trained on a corpus of training audio signals that are each encoded into a sequence of training temporal embeddings. Here, each training temporal embedding includes a respective speaker label.

In some examples, during each iteration subsequent to an initial iteration, determining the probability that the corresponding temporal embedding includes the presence of voice activity by the single new speaker is based on each other respective speaker embedding previously selected during each iteration prior to the corresponding iteration. In some implementations, during each of the plurality of iterations, the operations further include determining whether the probability for the corresponding temporal embedding in the sequence of temporal embeddings that is associated with the highest probability for the presence of voice activity by the single new speaker satisfies the confidence threshold. Here, selecting the respective speaker embedding is conditioned on the probability for the corresponding temporal embedding in the sequence of temporal embeddings that is associated with the highest probability for the presence of voice activity by the single new speaker that satisfies the confidence threshold. In these implementations, during each of the plurality of iterations, the operations may further include bypassing selection of the respective speaker embedding during the corresponding iteration when the probability for the corresponding temporal embedding in the sequence of temporal embeddings that is associated with the highest probability for the presence of voice activity by the single new speaker fails to satisfy the confidence threshold. Optionally, after bypassing selection of the respective speaker embedding during the corresponding iteration, the operations may further include determining a number N of the multiple speakers based on the number of speaker embeddings previously selected during the iterations prior to the corresponding iteration.

Predicting the respective voice activity indicator for each respective speaker of the multiple speakers at each time step may be based on the temporal embedding associated with the corresponding time step, the respective speaker embedding selected for the respective speaker, and a mean of all the speaker embeddings selected during the plurality of iterations. In some examples, predicting the respective voice activity indicator for each respective speaker of the multiple speakers at each time step includes using a voice activity detector having parallel first and second fully-connected neural networks. In these examples, the first fully-connected neural network of the voice activity detector is configured to project the temporal embedding associated with the corresponding time step, and the second fully-connected neural network of the voice activity detector is configured to project a concatenation of the respective speaker embedding selected for the respective speaker and a mean of all the speaker embedding selected during the plurality of iterations.

A training process may train the voice activity indicator on a corpus of training audio signals that are each encoded into a sequence of temporal embeddings. Here, each temporal embedding includes a corresponding speaker label. Optionally, the training process may include a collar-aware training process that removes losses associated with any of the training temporal embeddings that fall inside a radius around speaker turn boundaries.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7 is a schematic view of an example computing device that may be used to implement the systems and methods described herein.

Like reference symbols in the various drawings indicate like elements.

DETAILED DESCRIPTION

Figure 1:
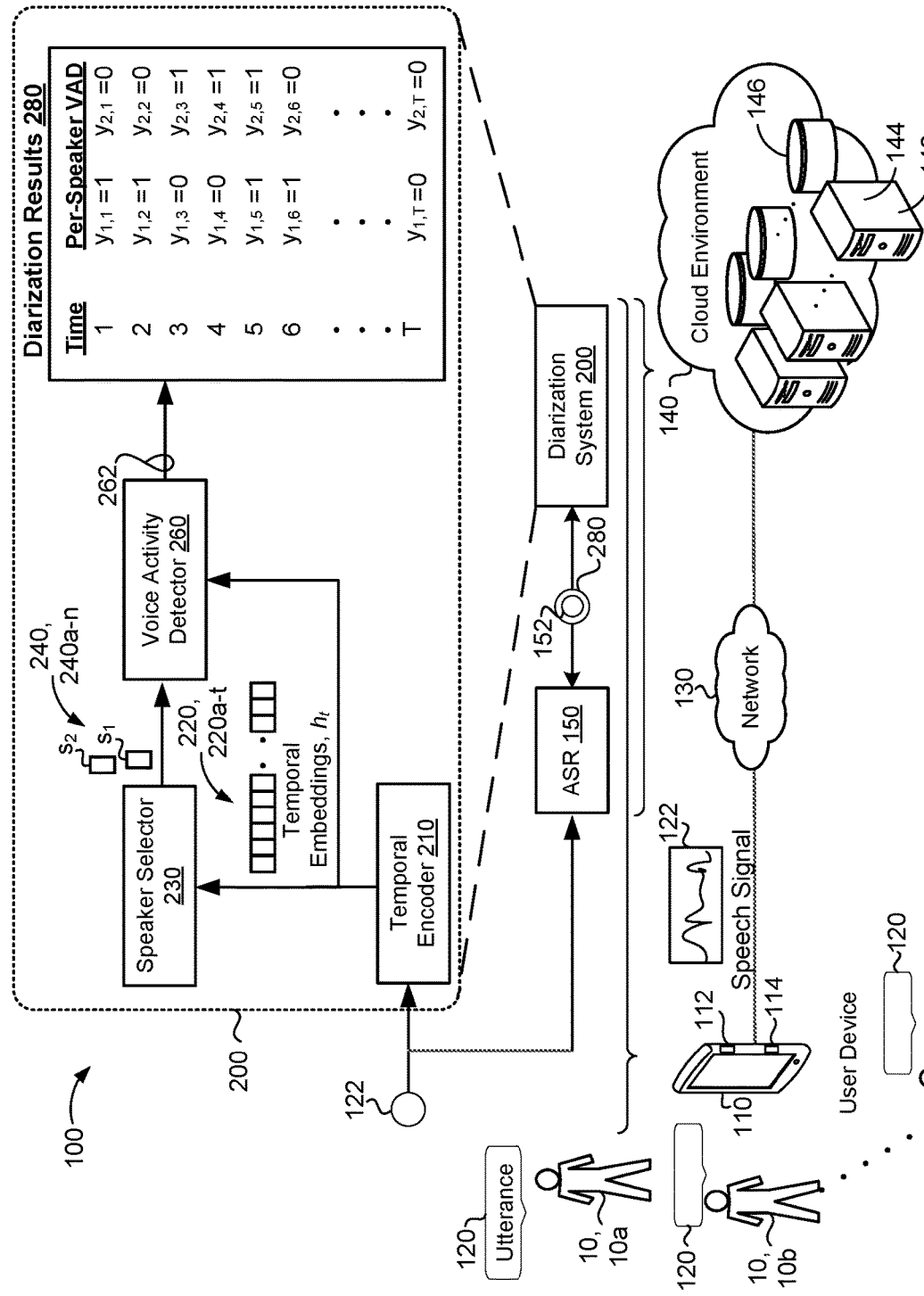
FIG. 1 is a schematic view an example speaker diarization system for performing speaker diarization.

Automatic speech recognition (ASR) systems generally rely on speech processing algorithms that assume only one speaker is present in a given input audio signal. An input audio signal that includes a presence of multiple speakers can potentially disrupt these speech processing algorithms, thereby leading to inaccurate speech recognition results output by the ASR systems. As such, speaker diarization is the process of segmenting speech from a same speaker in a larger conversation to not specifically determine who is talking (speaker recognition/identification), but rather, determine when someone is speaking. Put another way, speaker diarization includes a series of speaker recognition tasks with short utterances and determines whether two segments of a given conversation were spoken by the same individual or different individuals, and repeated for all segments of the conversation.

Existing speaker diarization systems generally include multiple relatively independent components, such as, without limitation, a speech segmentation module, an embedding extraction module, and a clustering module. The speech segmentation module is generally configured to remove non-speech parts from an input utterance and divide the input utterance into small fixed-length segments, while the embedding extraction module is configured to extract, from each fixed-length segment, a corresponding speaker-discriminative embedding. The speaker-discriminative embeddings may include i-vectors or d-vectors. The clustering modules employed by the existing speaker diarization systems are tasked with determining the number of speakers present in the input utterance and assign speaker identifies (e.g., labels) to each fixed-length segment. These clustering modules may use popular clustering algorithms that include Gaussian mixture models, mean shift clustering, agglomerative hierarchical clustering, k-means clustering, links clustering, and spectral clustering. Speaker diarization systems may also use an additional re-segmentation module for further refining the diarization results output from the clustering module by enforcing additional constraints.

These existing speaker diarization are limited by the fact that the extracted speaker-discriminative embeddings are not optimized for diarization, and therefore may not necessarily extract relevant features for disambiguating speakers in the presence of overlap. Moreover, the clustering modules operate in an unsupervised manner such that all speakers are assumed to be unknown and the clustering algorithm needs to produce new "clusters" to accommodate the new/unknown speakers for every new input utterance. The drawback with these unsupervised frameworks is that they are unable to improve by learning from large sets of labeled training data that includes fine-grained annotations of speaker turns (i.e., speaker changes), time-stamped speaker labels, and ground truth. Since this labeled training data is readily obtainable in many domain-specific applications and diarization training datasets, speaker diarization systems could benefit from the labeled training data by becoming more robust and accurate in producing diarization results. Moreover, existing state-of-the-art clustering algorithms mostly execute offline, thereby making it difficult to produce diarization results by clustering in real-time scenarios. Speaker diarization systems are also required to perform on long sequences of speech (i.e., several minutes), however, training speaker diarization systems over long speech sequences with a large batch size may be difficult due to memory constraints.

To overcome the limitations of typical diarization systems discussed above, implementations herein are directed toward a Diarization by Iterative Voice Embedding (DIVE) system. The DIVE system includes an end-to-end neural diarization system that combines and jointly trains three separate components/modules: a temporal encoder tasked with projecting an input audio signal to a downsampled embedding space that includes a sequence of temporal embeddings each representing current speech content at a corresponding time step; a speaker selector tasked with performing an iterative speaker selection process to select long-term speaker vectors for all speakers in the input audio stream; and a voice activity detector (VAD) tasked with detecting voice activity for each speaker at each of the plurality of time steps.

Referring to FIG. 1, a system 100 includes a user device 110 capturing speech utterances 120 from a group of speakers (e.g., users) 10, 10a-n and communicating with a remote system 140 via a network 130. The remote system 140 may be a distributed system (e.g., cloud computing environment) having scalable/elastic resources 142. The resources 142 include computing resources 144 (e.g., data processing hardware) and/or storage resources 146 (e.g. memory hardware). In some implementations, the user device 110 and/or the remote system 140 executes the DIVE system 200 (also referred to as an end-to-end neural diarization system 200) that is configured to receive an input audio signal (i.e., audio data) 122 that corresponds to the captured utterances 120 from the multiple speakers 10. The DIVE system 200 encodes the input audio signal 122 into a sequence of T temporal embeddings 220, 220a-t and iteratively selects a respective speaker embedding 240, 240a-n for each respective speaker 10. Using the sequence of T temporal embeddings 220 and each selected speaker embedding 240, the DIVE system 200 predicts a respective voice activity indicator 262 for each respective speaker 10 during each of a plurality of time steps. Here, the voice activity indicator 262 indicates at each time step whether a voice of the respective speaker is active or inactive. The respective voice activity indicator 262 predicted for each respective speaker 10 during each of the plurality of time steps may provide diarization results 280 indicating when the voice of each speaker is active (or inactive) in the input audio signal 122. Each time step may correspond to a respective one of the temporal embeddings. In some examples, each time step includes a duration of 1 millisecond. As such, the diarization results 280 may provide time-stamped speaker labels based on the per-speaker voice activity indicators 262 predicted at each time step that not only identify who is speaking at a given time, but also identify when speaker changes (e.g., speaker turns) occur between adjacent time steps.

In some examples, the remote system 140 further executes an automated speech recognition (ASR) module 150 that is configured to receive and transcribe the audio data 122 into a corresponding ASR result 152. The user device 110 may similarly execute the ASR module 150 on-device in lieu of the remote system 140, which may be useful when network connections are unavailable or quick (albeit lower-fidelity) transcriptions are preferable. Additionally or alternatively, the user device 110 and the remote system 140 may both execute corresponding ASR modules 150 such that the audio data 122 can be transcribed on-device, via the remote system 140, or some combination thereof. In some implementations, the ASR module 150 and the DIVE system 200 both execute entirely on the user device 110 and do not require any network connection to the remote system 140. The ASR result 152 may also be referred to as a 'transcription' or simply 'text'. The ASR module 150 may communicate with the DIVE system 200 to utilize the diarization results 280 associated with the audio data 122 for improving speech recognition on the audio data 122. For instance, the ASR module 150 may apply different speech recognition models (e.g., language models, prosody models) for different speakers identified from the diarization results 280. Additionally or alternatively, the ASR module 150 and/or the DIVE system 200 (or some other component) may index a transcription 152 of the audio data 122 using the per-speaker, per-time step voice activity indicators 262. For instance, a transcription of a conversation between multiple co-workers (e.g., speakers 10) during a business meeting may be indexed by speaker to associate portions of the transcription with the respective speaker for identifying what each speaker said.

The user device 110 includes data processing hardware 112 and memory hardware 114. The user device 110 may include an audio capture device (e.g., microphone) for capturing and converting the speech utterances 120 from the speakers 10 into the audio data 122 (e.g., electrical signals). In some implementations, the data processing hardware 112 is configured to execute a portion of the DIVE system 200 locally while a remaining portion of the diarization system 200 executes on the remote system 140. Alternatively, the data processing hardware 112 may execute the DIVE system 200 in lieu of executing the DIVE system 200 on the remote system 140. The user device 110 can be any computing device capable of communicating with the remote system 140 through the network 130. The user device 110 includes, but is not limited to, desktop computing devices and mobile computing devices, such as laptops, tablets, smart phones, smart speakers/displays, smart appliances, internet-of-things (IoT) devices, and wearable computing devices (e.g., headsets and/or watches). The user device 110 may optionally execute the ASR module 150 to transcribe the audio data 122 into corresponding text 152. For instance, when network communications are down or not available, the user device 110 may execute the diarization system 200 and/or the ASR module 150 locally to produce the diarization results for the audio data 122 and/or generate a transcription 152 of the audio data 122.

In the example shown, the speakers 10 and the user device 110 may be located within an environment (e.g., a room) where the user device 110 is configured to capture and convert speech utterances 120 spoken by the speakers 10 into the audio signal 122 (also referred to as audio data 122). For instance, the speakers 10 may correspond to co-workers having a conversation during a meeting and the user device 110 may record and convert the speech utterances 120 into the audio signal 122. In turn, the user device 110 may provide the audio signal 122 to the DIVE system 200 for predicting the voice activity indicators 262 for each of the speakers 10 during each of the plurality of time steps. Thus, the DIVE system 200 is tasked with processing the audio signal 122 to determine when someone is speaking without specifically determining who is talking via speaker recognition/identification.

In some examples, at least a portion of the utterances 120 conveyed in the audio signal 122 are overlapping such that at a given instant in time voices of two or more of the speakers 10 are active. Notably, a number N of the multiple speakers 10 may be unknown when the input audio signal 122 is provided as input to the DIVE system 200 and the DIVE system 200 may predict the number N of the multiple speakers 10. In some implementations, the user device 110 is remotely located from the speakers 10. For instance, the user device 110 may include a remote device (e.g., a network server) that captures speech utterances 120 from speakers that are participants in a phone call or video conference. In this scenario, each speaker 10 would speak into their own device (e.g., phone, radio, computer, smartwatch, etc.) that captures and provides the speech utterances 120 to the remote user device 110 for converting the speech utterances 120 into the audio data 122. Of course in this scenario, the utterances 120 may undergo processing at each of the user devices and be converted into corresponding audio signals 122 that are transmitted to the remote user device 110 which may additionally processes the audio signal 122 provided as input to the DIVE system 200.

In the example shown, the DIVE system 200 includes a temporal encoder 210, an iterative speaker selector 230, and a voice activity detector (VAD) 260. The temporal encoder 210 is configured to receive the audio signal 122 and encode the input audio signal 122 into the sequence of temporal embeddings h 220, 220a-t. Each temporal embedding h 220 may be associated with a corresponding time step t and represent speech content extracted from the input audio signal 122 during the corresponding time step t. The temporal encoder 210 sends the sequence of temporal embeddings 220 to the iterative speaker selector 230 and the VAD 260.

During each of a plurality of iterations i each corresponding to a respective speaker of the multiple speakers 10, the iterative speaker selector 230 is configured to select a respective speaker embedding 240, 240a-n for each respective speaker 10. For simplicity, the audio signal 122 in FIG. 1 includes utterances 120 spoken by only two distinct speakers 10, however, the iterative speaker selector 230 may select speaker embeddings 240 for any number N of distinct speakers 10 present in the input audio signal 122. Thus, in the example two-speaker scenario, the iterative speaker selector 230 selects a first speaker embedding $s_1$ 240 for the first speaker 10a during an initial first iteration (i=1), and during a subsequent second iteration (i=2), the iterative speaker selector 230 selects a second speaker embedding $s_2$ 240 for the second speaker 10b. During each iteration i, the iterative speaker selector 230 selects the respective speaker embedding 240 by determining, for each temporal embedding 220 in the sequence of T temporal embeddings 220, a probability that the corresponding temporal embedding 220 includes a presence of voice activity by a single new speaker 10 for which a speaker embedding 240 was not previously selected during a previous iteration. Thereafter, the iterative speaker selector 230 selects, during the corresponding iteration i, the respective speaker embedding 240 for the respective speaker 10 as the temporal embedding 220 in the sequence of T temporal embeddings 220 that is associated with the highest probability for the presence of voice activity by the single new speaker 10. That is, the iterative speaker selector 230 selects the respective speaker embedding 240 that has the highest probability of being associated with the speech content of the respective T temporal embeddings 220.

The VAD 260 receives the temporal embedding 220 and speaker embeddings 240 (e.g., $s_1$ and $s_2$ in the two-speaker scenario of FIG. 1) and predicts, at each time step, the respective voice activity indicator 262 for each respective speaker of the multiple N speakers. In particular, the VAD 260 predicts the voice activity indicator 262 based on the temporal embedding 220 that represents the speech content at the respective time step t, a speaker embedding 240 that represents the identity of the speaker of interest, and another speaker embedding 240 that represents all of the speakers 10. Here, the respective voice activity indicator 262 indicates whether a voice of the respective speaker 10 is active or inactive at the corresponding time step. Notably, the VAD 260 predicts the voice activity indicator 262 without particularly identifying the respective speaker 10 from the multiple speakers 10. The DIVE system 200 may use the voice activity indicator 262 at each time step to provide diarization results 280. As shown in FIG. 1, the diarization results 280 include the voice activity indicator $y_{i,t}$ of speaker i at time step t. Accordingly, the voice activity indicator $y_{i,t}$ 262 of the diarization results 280 provides per-speaker, per-timestep VAD results with a value of "0" when the speaker 10 is inactive and a value of "1" when the speaker 10 is active during time step t. As shown at time step (t=4), multiple speakers 10 may be active at the same time.

Figure 2:
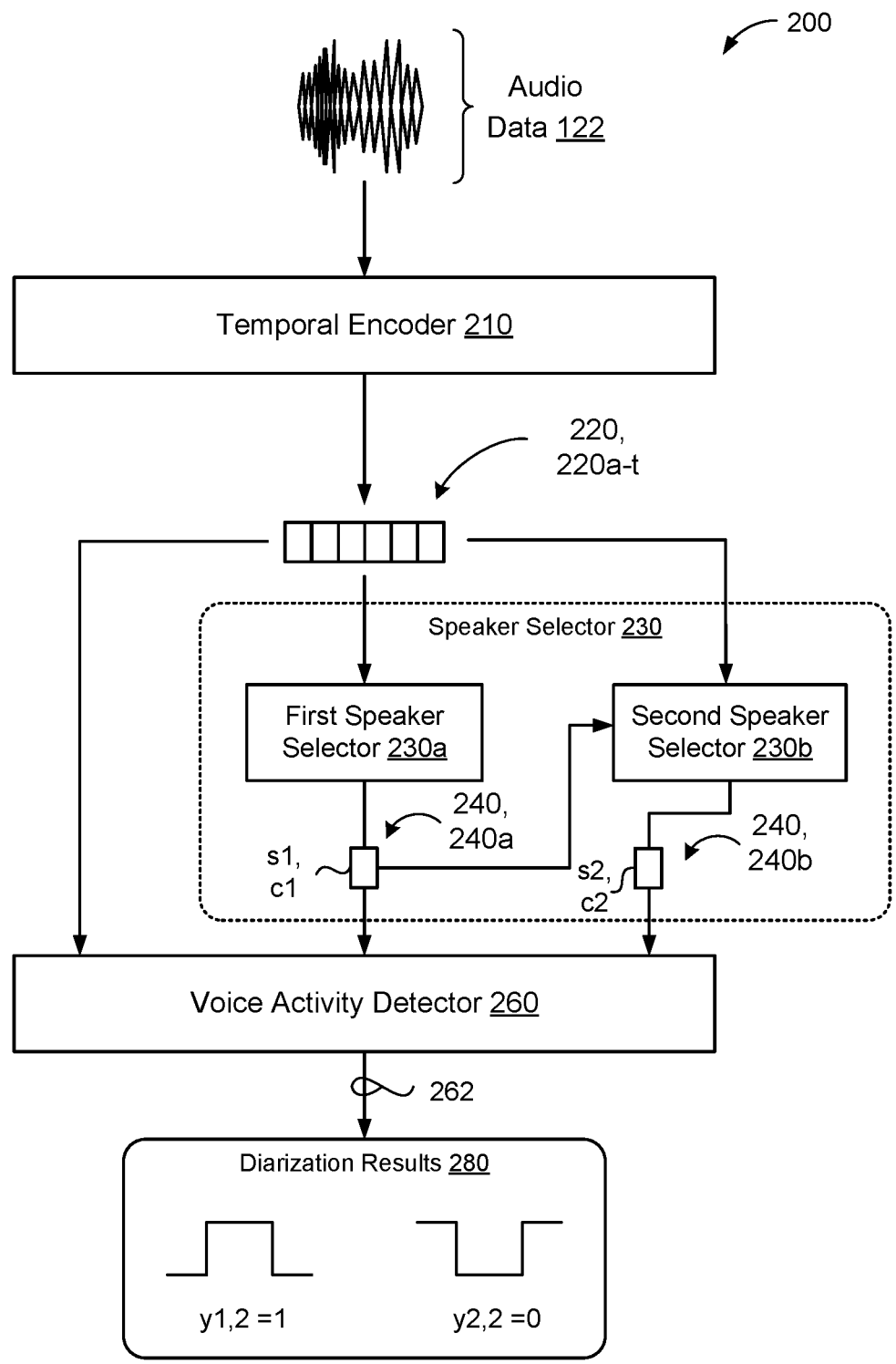
FIG. 2 is a schematic view of the example speaker diarization system of FIG. 1.

FIG. 2 shows the temporal encoder 210, the iterative speaker selector 230, and the VAD 260 of the DIVE system 200. The temporal encoder 210 encodes the input audio signal 122 into the sequence of temporal embeddings 220, 220a-t each associated with a corresponding time step t. The temporal encoder 210 may project the sequence of temporal embeddings 220 encoded from the input audio signal 122 into a downsampled embedding space. The temporal encoder 210 may cascade residual blocks of dilated 1D-convolutions, with parametric rectified linear unit (PReLU) activations and layer normalization, and perform downsampling by introducing 1D average pooling layers between the residual blocks. Thus, the input audio signal 122 may correspond to an input waveform x such that the temporal encoder 210 produces T temporal embeddings 220 (e.g., latent vectors) each having a dimension D. Accordingly, each temporal embedding 220 may be represented as $h(x) \in \mathbb{R}^{T \times D}$.

The iterative speaker selector 230 outputs the respective speaker embedding 240, 240a-n for each speaker 10 detected in the input audio signal 122. During each of the plurality of iterations i, the iterative speaker selector 230 receives the temporal embeddings 220 and selects a respective speaker embedding 240 that was not selected in a previous iteration i (i.e., a new speaker embedding 240). In some examples, the speaker selector 230 receives, as input, the previously selected speaker embedding 240 along with the sequence of T temporal embeddings 220 during each iteration i, and outputs the probability as a confidence c that each corresponding temporal embedding 220 includes the presence of voice activity by a single new speaker. The previously selected speaker embedding 240 may include an average of each respective speaker embedding 240 previously selected during previous iterations. Notably, the previously selected speaker embedding 240 would be zero during the initial first iteration since no speaker embedding 240 has been previously selected. Advantageously, the iterative process performed by the iterative speaker selector 230 does not require a particular speaker ordering to training to select the speaker embeddings 240, and therefore does not require Permutation-Invariant Training (PIT) to avoid penalties for choosing speaker orders. PIT suffers from inconsistent assignments when applied on long audio sequences, and therefore is not preferable for use in learning long-term speaker representations/embeddings.

For simplicity, FIG. 2 illustrates the audio signal 122 including utterances 120 spoken by only two distinct speakers 10, however, this is a non-limiting example and the audio signal 122 may include utterances spoken by any number of distinct speakers 10. In the example shown, the iterative speaker selector 230 includes a first speaker selector 230, 230a that, at a first iteration (i=1), receives the sequence of T temporal embeddings 220 and selects a first speaker embedding $s_1$ 240, 240a. The first speaker embedding $s_1$ 240a includes a first confidence $c_1$ indicating the likelihood that the temporal embedding 220 includes the first speaker embedding $s_1$ 240a. Here, because there are no previously selected speaker embeddings 240 the first speaker selector 230a may select any of the speaker embeddings 240. Continuing with the example, the iterative speaker selector 230 includes a second speaker selector 230, 230b that, at a subsequent iteration (i=2), receives the sequence of T temporal embeddings 220 and the previously selected first speaker embedding $s_1$ 240a and selects a second speaker embedding $s_2$ 240, 240b. The second speaker embedding $s_2$ 240b includes a second confidence $c_2$ indicating the likelihood that the temporal embedding 220 includes the second speaker embedding $s_2$ 240b. Here, the second speaker selector 230b may select any of the speaker embeddings 240 besides the previously selected speaker embeddings (e.g., the first speaker embedding $s_1$ 240a).

The iterative speaker selector 230 may include any number of speaker selectors 230 to select the speaker embeddings 240. In some examples, the iterative speaker selector 230 determines whether the confidence c associated with the speaker embedding 240 for the corresponding temporal embedding 220 that is associated with the highest probability for the presence of voice activity by the single new speaker satisfies a confidence threshold. The iterative speaker selector 230 may continue iteratively selecting speaker embeddings 240 until the confidence c fails to satisfy the confidence threshold.

In some implementations, the iterative speaker selector 230 includes a multi-class linear classifier with a fully-connected network that is configured to determine a probability distribution of possible event types e for each corresponding temporal embedding 220 during each iteration i. The possible event types $e_t$ may include four possible types: the presence of voice activity by the single new speaker 10; a presence of voice activity for a single previous speaker 10 for which another respective speaker embedding 240 was previously selected during a previous iteration; a presence of overlapped speech; and a presence of silence. Accordingly, the multi-class linear classifier with the fully-connected network may include a 4-by-D matrix $g_\mu(\mu_i)$ that represents a 4-class linear classifier that maps each temporal embedding $h_t$ 220 to one of the four possible event types $e_t$. Here, each temporal embedding 220 may be mapped to the event type having the highest probability in the probability distribution of possible event types during each iteration i. The probability distribution may be represented as follows.

$$P(e_t|h_t, u_i) = \text{softmax}(g_u(\mu_i)g_h(h_t)) \quad (1)$$

In Equation 1, $e_t$ represents the event type, $h_t$ represents the respective temporal embedding at time t, $u_i$ represents the average embedding of each previously selected speaker at iteration i, and $g_h$ represents a fully-connected neural network. During inference, the confidence c for a respective speaker embedding 240 may be represented as follows.

$$c_i(t_i^*) = {}^{max c_i(t)}_t = {}^{max}_t P(e_t = \text{novel speaker} | h_t, u_i) \quad (2)$$

where $c_i(t_i^*)$ corresponds to the temporal embedding 220 that is associated with the highest probability for the presence of voice activity by the single new speaker 10. Thus, the selected speaker embedding 240 during each iteration corresponds to the temporal embedding that reaches the maximal confidence (i.e., highest probability) according to Equation 1. Selecting a speaker embedding 240 may be conditioned on $c_i(t_i^*)$ satisfying a confidence threshold. If the confidence threshold is not satisfied, the iterative speaker selector 230 may bypass selection during the corresponding iteration and not perform any subsequent iterations. In this scenario, the DIVE system 200 may determine a number N of the multiple speakers 10 based on the number of speaker embeddings 240 previously selected during iterations prior to the corresponding iteration that bypasses selection of speaker embeddings 240. During training, $h_{t_i^*}$ is not output by the iterative speaker selector 230, but instead the temporal embedding $h_t$ 220 is sampled uniformly from times with a novel speaker marked as active in the labeled training data. The iterative speaker selector 230 is trained in a supervised manner by a training process and parameters of training process learn to minimize the negative log likelihood of the 4-way linear classifier as follows.

$$\mathcal{L}_{selector}(h, \mu) = -\frac{1}{TN}\sum_{t=1}^{T}\sum_{i=1}^{N}\log P(e_t | h_t, \mu_i) \quad (3)$$

After the speaker embeddings 240 are selected (e.g., $s_1$ and $s_2$ in the two-speaker scenario of FIG. 2), the VAD 260 predicts, at each time step, the respective voice activity indicator 262 for each respective speaker of the multiple N speakers based on the respective speaker embeddings 240, a mean of all the speaker embeddings 240 previously selected, and the temporal embedding 220 associated with the corresponding time step as follows.

$$y_i \in \{0,1\}^T \quad (4)$$

where i=1, 2, ... N. The respective voice activity indicator ($y_{i,t}$) 262 indicates whether a voice of the respective speaker (indexed by iteration i) 10 is active ($y_{i,t}=1$) or inactive ($y_{i,t}=0$) at the corresponding time step (indexed by time step t). The respective voice activity indicator 262 may correspond to a binary per-speaker voice activity mask that provides a value of "0" when the respective speaker is inactive and a value of "1" when the respective speaker is active during the time step t. The voice activity indicator ($y_{i,t}$) 262 predicted at each time step t for each speaker i may be based on the temporal embedding $h_t$ associated with the corresponding time step, the respective speaker embedding $s_i$ selected for the respective speaker, and a mean of all the speaker embeddings $\bar{s}$ selected during the plurality of iterations.

In some implementations, the VAD 260 contains two parallel fully-connected neural networks $f_h$ and $f_s$ with PReLU activations with layer normalization, except for a last linear projection layer which includes a linear projection. In these implementations, to predict the voice activity indicator $y_{i,t}$ of speaker i at time step t, $f_h$ and $f_s$ project the temporal embedding $h_t \in \mathbb{R}^D$ at the corresponding time step and the speaker embeddings $[s_i;\bar{s}] \in \mathbb{R}^{2D}$ as follows.

$$\hat{y}_{i,t} = f_h(h_t)^T f_s([s_i;\bar{s}]) \quad (5)$$

In Equation 5, $[s_i; \bar{s}]$ represents the concatenation along a channel axis of the respective speaker embedding $s_i$ selected for the corresponding speaker i and $$\bar{s} = \frac{1}{N}\sum_{j=1}^{N} s_j$$

the mean of all of the speaker embeddings 240. Notably, the mean speaker embedding calls the VAD 260 to exploit contrasts between the respective speaker embedding 240 associated with the speaker i of interest as well as all other speakers present in the sequence of temporal embeddings 220. In the example shown, the VAD 260 predicts a voice activity inidicators 262 for a first and second speaker 10 at time step (t=2). The voice activity indicators 262 may provide diarization results 280 indicating that the first speaker 10 is active at the time step (t=2) (e.g., $y_{1,2}=1$) and the second speaker 10 is inactive at the time step (t=2) (e.g., $y_{2,2}=0$).

Figure 3:
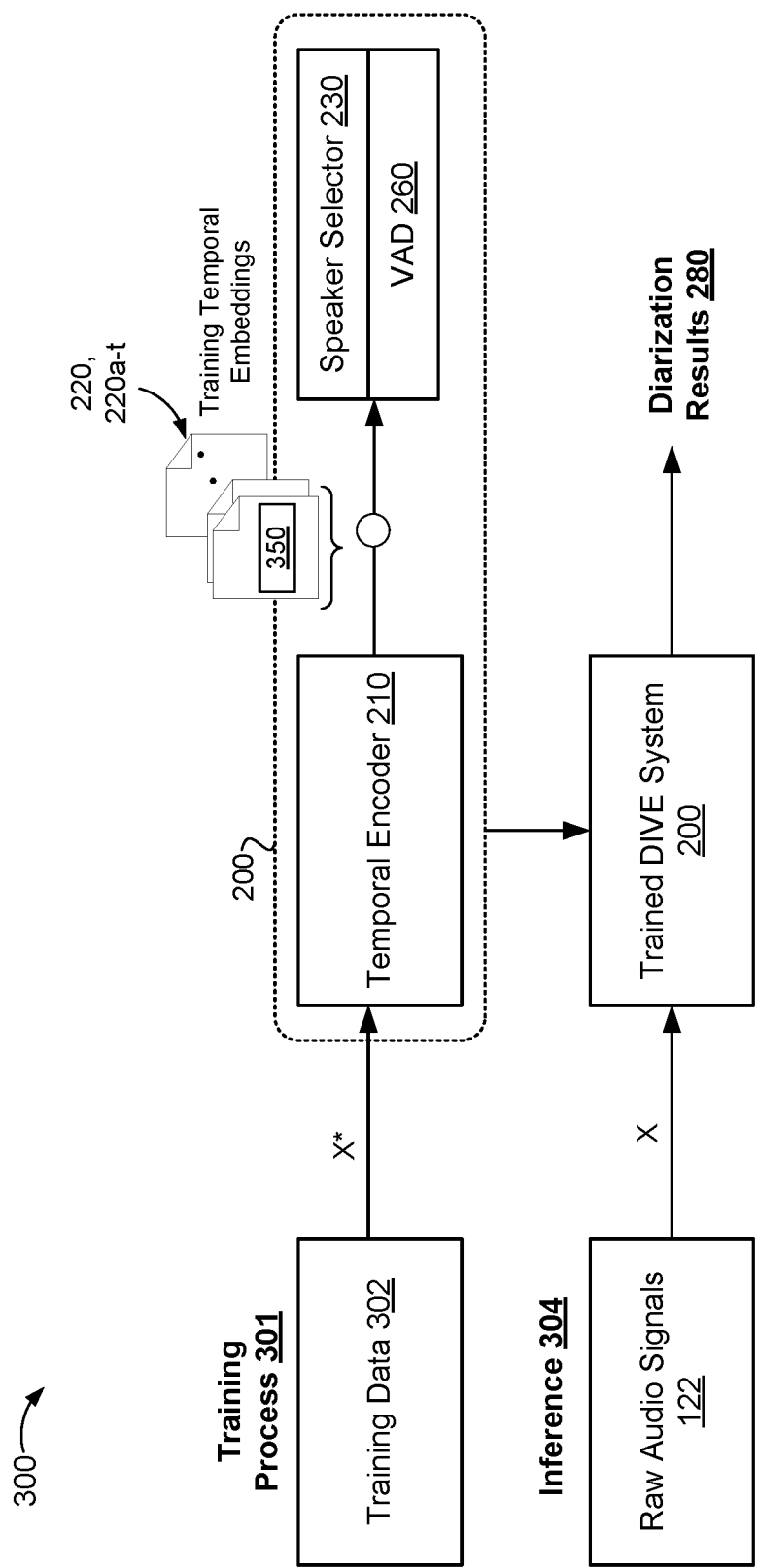
FIG. 3 is a schematic view of an example training process for training the speaker diarization system of FIG. 1 and using the trained speaker diarization system of FIG. 1 during inference.

Referring to FIG. 3, a schematic view 300 illustrates an example training process 301 and inference 304 for the DIVE system 200. In some implementations, the training process 301 jointly trains the temporal encoder 210, the iterative speaker selector 230 that includes the multi-class linear classifier with the fully-connected network, and the VAD 260 of the DIVE system 200 on fully-labeled training data 302 that includes a corpus of training audio signals x* each including utterances 120 spoken by multiple different speakers 10. The training audio signals x* may include long speech sequences representing speech for several minutes. In some examples, the training process 301 samples W fixed-length windows per training audio signal x*, encodes the training audio signal x* using the temporal encoder 210, and concatenates W fixed-length windows along the temporal axis. By concatenating the W fixed-length windows, the fully-labeled training data 302 increases speaker diversity and speaker turns for each training audio signal x* and keeps while keeping the memory usage low. That is, the training audio signal x* may represent same speakers over windows far apart during the long speech sequences. Some training audio signals x* may include portions where utterances 120 spoken by two or more different speakers 10 overlap. Each training audio signal x* is encoded by the temporal encoder 210 into a sequence of training temporal embeddings 220 that are each assigned a respective speaker label 350 indicating an active speaker or silence.

The speaker labels 350 may be represented as a sequence of training speaker labels $\hat{y}=(\hat{y}_1, \hat{y}_2, \ldots, \hat{y}_T)$, where entry $\hat{y}_t$ in the sequence represents the speaker label 350 assigned to training temporal embedding 220 at time step t. In the example shown, the training process 301 provides the sequence of training temporal embeddings 220T encoded by the temporal encoder 210 and assigned speaker labels 350 for training the iterative speaker selector 230 during each of the plurality of i iterations, and subsequently, the VAD 260 based on the speaker embeddings 240 selected by the iterative speaker selector 230 during the plurality of iterations.

As the temporal encoder 210, the iterative speaker selector 230, and the VAD 260 are trained jointly, the VAD 260 is also trained on the corpus of training audio signals x*, where each training audio signal x* is encoded into a sequence of training temporal embeddings each including a corresponding voice activity indicator (i.e., a speaker label ŷ) indicating which voice is present/active in the corresponding training temporal embedding. The training process may train the VAD 260 on the following VAD loss.

$$\mathcal{L}_{vad}(\hat{y}, y) = -\frac{1}{TN} \sum_{t=1}^{T} \sum_{i=1}^{N} \log(\sigma(\hat{y}_{i,t}(2y_{i,t}-1))) \quad (6)$$

where the training process backpropagates the per-speaker, per-time step VAD loss of Equation 6 as independent binary classification tasks. The DIVE system 200 may be evaluated in terms of a diarization error rate (DER) of the diarization results 280. In some examples, the training process applies a collar that provides a tolerance around speaker boundaries such that the training VAD loss of Equation 6 does not penalize the VAD 260 for small annotation errors in the training data. In some examples, a typical value for the tolerance representing the collar is about 250 ms on each side of a speaker turn boundary (500 ms) specified in the labeled training data. Accordingly, the training process may compute a masked VAD loss by removing VAD losses associated with frames/time steps that fall inside the collar from the total loss as follows.

$$\mathcal{L}_{vad}^{collar}(\hat{y}, y) = -\frac{1}{TN} \sum_{\substack{t=1 \\ t \notin B_r}}^{T} \sum_{i=1}^{N} \log(\sigma(\hat{y}_{i,t}(2y_{i,t}-1))) \quad (7)$$

where $B_r$ includes the set of audio frames/time steps that lie within a radius r around speaker turn boundaries. The training process may backpropagate the masked VAD loss computed by Equation 7. During training, a total loss for the DIVE system 200 may be computed for jointly training the temporal encoder 210, the iterative speaker selector 230, and the VAD 260 as follows.

$$\mathcal{L}_{total} = \mathcal{L}_{selector} + \mathcal{L}_{vad}^{collar} \quad (8)$$

The total loss may similarly be computed without application of the collar loss by substituting the VAD loss of Equation 7.

The iterative speaker selector 230 may be trained based on the speaker selector loss represented by Equation 3 and the VAD 260 may be trained based on the VAD loss represented by Equation 6 or Equation 7 when the training collar is applied. That is, the training process 301 may include a collar-aware training process that removes losses associated with any of the training temporal embeddings 220 that fall inside a radius around speaker turn boundaries. The collar-aware training process does not penalize or train the DIVE system 200 on small annotation errors. For example, the radius around speaker turn boundaries may include 250 ms on each side of the speaker turn boundary (500 ms in total). Thus, the DIVE system 200 may be trained on a total loss computed by Equation 8.

The separate components 210, 230, 260 of the DIVE system 200 may include respective neural networks such that the training process 201 generates hidden nodes, weights of connections between the hidden nodes and input nodes that correspond to the to the fully-labeled training data 302, weights of connections between the hidden nodes and output nodes, and weights of connections between layers of the hidden nodes themselves to minimize the losses of Equations 3, 6, 7, and 8. Thereafter, during inference 304, the fully trained DIVE system 200 may be employed against input data (e.g., raw audio signals 122) to generate unknown output data (e.g., voice activity indicators 262) corresponding diarization results 280.

Figure 5:
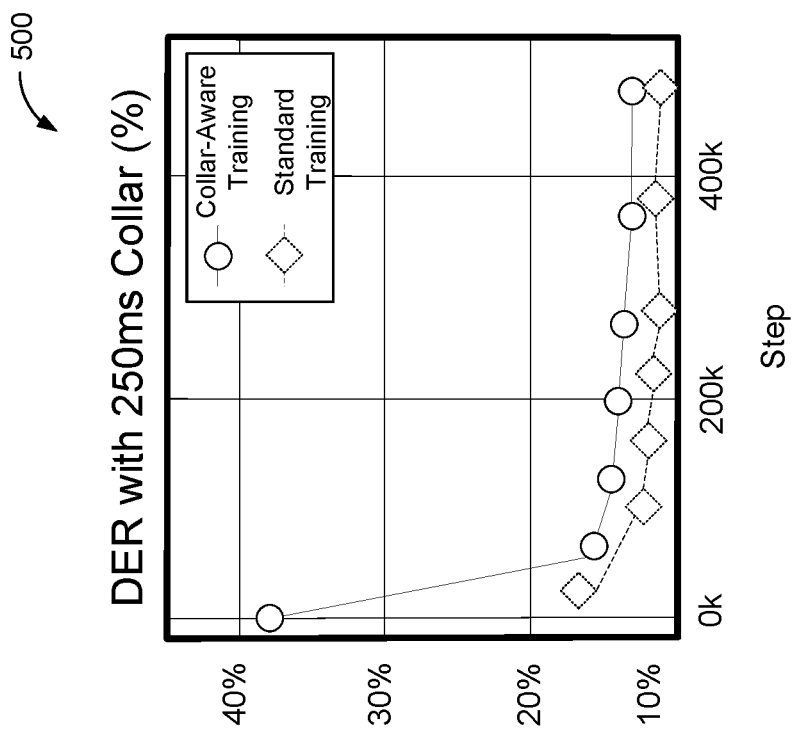
FIGS. 4 and 5 show example plots of diarization error rate (DER) when collar training is not applied (FIG. 4) and when collar training is applied (FIG. 5).
Figure 4:
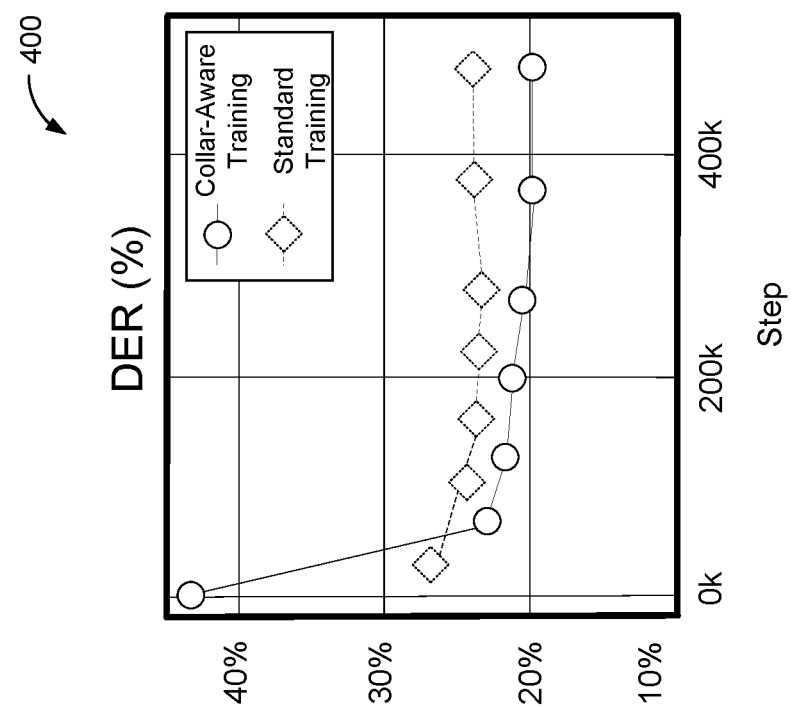

FIG. 4 shows a plot 400 of raw diarization error rate (DER) (%) evaluation for a standard training process and a collar-aware training process used to train the DIVE system 200. In plot 400, the standard training process outperforms the collar-aware training process when using the raw DER (%) evaluation. FIG. 5 shows a plot 500 of the collar-aware DER evaluation that includes a collar of 250 ms applied on each side of speaker turn boundaries for the standard training process and the collar-aware training process. Here, the 250 ms is applied on each side of the speaker turn boundaries according to Equation 7. Notably, the collar-aware training process outperforms the standard training process when evaluating using the collar-aware DER evaluation. Thus, FIG. 5 illustrates that when the evaluation technique includes the collar-aware DER evaluation it is beneficial to integrate the collar-aware training to train the DIVE system 200.

Figure 6:
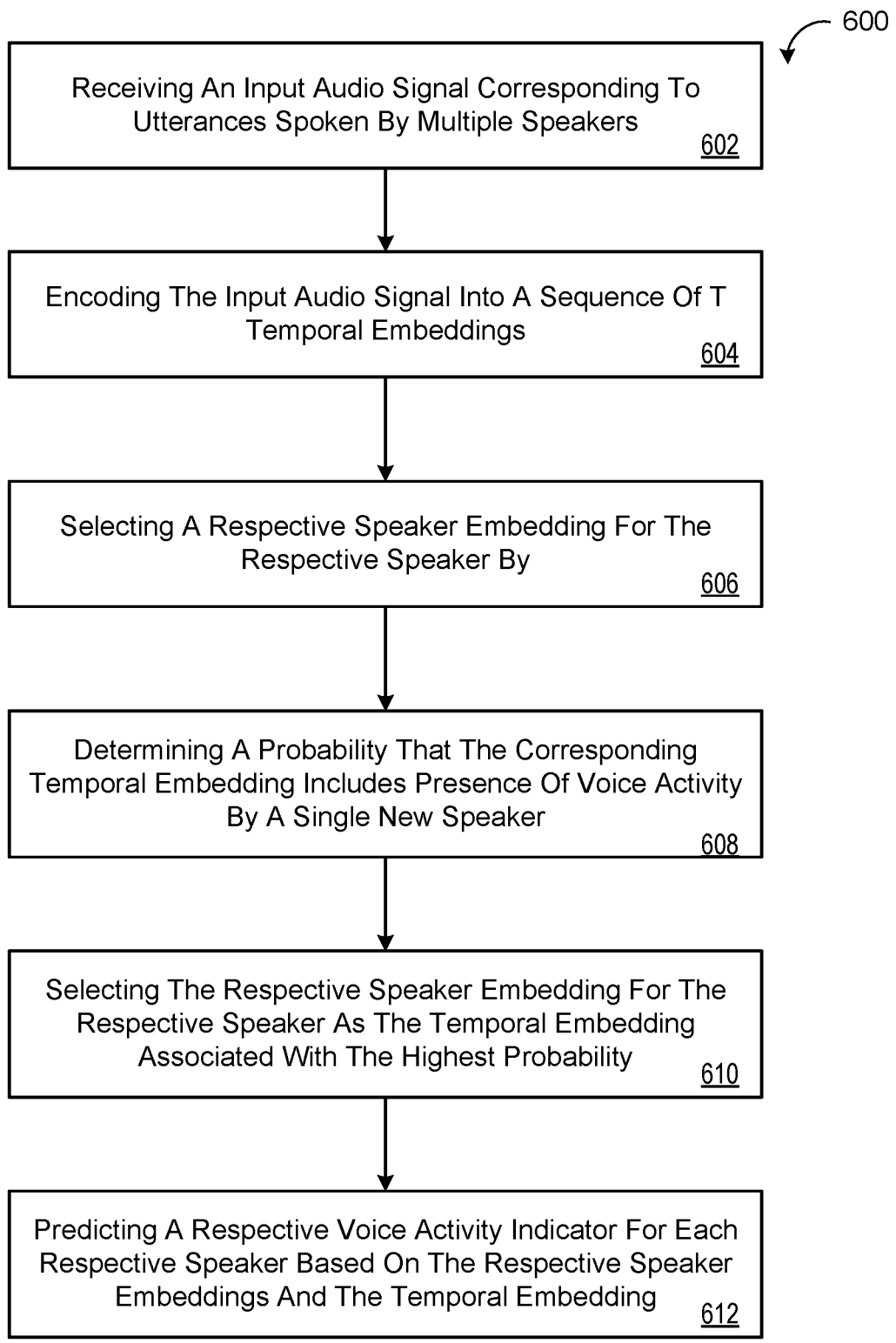
FIG. 6 is a flowchart of an example arrangement of operations for a method of performing speaker diarization on an input audio signal containing utterances of speech spoken by multiple different speakers.

FIG. 6 is a flowchart of an exemplary arrangement of operations for a method 600 of performing speaker diarization on a received utterance 120 of speech. The data processing hardware 112, 144 may execute the operations for the method 600 by executing instructions stored on the memory hardware 114, 146. At operation 602, the method 600 includes receiving an input audio signal 122 corresponding to utterances 120 spoken by multiple speakers 10, 10*a-n*. At operation 604, the method 600 includes encoding the input audio signal 122 into a sequence of T temporal embeddings 220, 220*a-t*. Here, each temporal embedding 220 is associated with a corresponding time step t and represents speech content extracted from the input audio signal 122 at the corresponding time step t.

During each of a plurality of iterations i that each correspond to a respective speaker 10 of the multiple speakers 10, the method 600, at operation 606, includes selecting a respective speaker embedding 240, 240*a-n* for the respective speaker 10. For each temporal embedding 220 in the sequence of T temporal embeddings 220, the method 600, at operation 608, includes determining a probability (e.g., confidence c) that the corresponding temporal embedding 220 includes a presence of voice activity by a single new speaker 10 for which a speaker embedding 240 was not previously selected during for during a previous iteration i. At operation 610, the method 600 includes selecting the respective speaker embedding 240 for the respective speaker 10 as the temporal embedding 220 in the sequence of T temporal embeddings 220 associated with the highest probability for the presence of voice activity by the single new speaker 10. At operation 612, the method 600, at each time step t, includes predicting a respective voice activity indicator 262 for each respective speaker 10 of the multiple speakers 10 based on the respective speaker embeddings 240 selected during the plurality of iterations i and the temporal embedding 220 associated with the corresponding time step t. Here, the respective voice activity indicator 262 indicates whether a voice of the respective speaker 10 is active or inactive at the corresponding time step t.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

FIG. 7 is schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs).

Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
    receiving an input audio signal corresponding to utterances spoken by multiple speakers;
    encoding the input audio signal into a sequence of T temporal embeddings, each temporal embedding associated with a corresponding time step and representing speech content extracted from the input audio signal at the corresponding time step;
    after receiving the input audio signal, during each iteration of a plurality of iterations each corresponding to a respective speaker of the multiple speakers, selecting a respective speaker embedding for the respective speaker of a corresponding iteration by:
        receiving a previously selected speaker embedding comprising an average of each respective speaker embedding previously selected during previous iterations;
        for each respective temporal embedding in the sequence of T temporal embeddings, determining, based on the previously selected speaker embedding, a probability that the respective temporal embedding includes a presence of voice activity by a single new speaker for which a speaker embedding was not previously selected during any previous iteration;
        determining that the probability satisfies a confidence threshold; and based on determining that the probability satisfies the confidence threshold, selecting a respective one of the temporal embeddings from among the sequence of T temporal embeddings as the respective speaker embedding for the respective speaker of the corresponding iteration, the selected respective one of the temporal embeddings associated with the highest probability for the presence of voice activity by the single new speaker not selected during any previous iteration; and at each time step, predicting a respective voice activity indicator for each respective speaker of the multiple speakers based on the respective speaker embeddings selected during the plurality of iterations and the respective temporal embedding associated with the corresponding time step, the respective voice activity indicator indicating whether a voice of the respective speaker is active or inactive at the corresponding time step.

2. The computer-implemented method of claim 1, wherein at least a portion of the utterances in the received input audio signal are overlapping.

3. The computer-implemented method of claim 1, wherein a number of the multiple speakers is unknown when the input audio signal is received.

4. The computer-implemented method of claim 1, wherein the operations further comprise, while encoding the input audio signal, projecting the sequence of T temporal embeddings encoded from the input audio signal to a downsampled embedding space.

5. The computer-implemented method of claim 1, wherein, during each iteration of the plurality of iterations for each respective temporal embedding in the sequence of T temporal embeddings, determining the probability that the respective temporal embedding includes the presence of voice activity by the single new speaker comprises determining a probability distribution of possible event types for the respective temporal embedding, the possible event types comprising:
the presence of voice activity by the single new speaker;
a presence of voice activity for a single previous speaker for which another respective speaker embedding was previously selected for during a previous iteration;
a presence of overlapped speech; and
a presence of silence.

6. The computer-implemented method of claim 5, wherein determining the probability distribution of possible event types for the respective temporal embedding comprises:
receiving, as input to a multi-class linear classifier with a fully-connected network, the respective temporal embedding and the previously selected speaker embedding comprising the average of each respective speaker embedding previously selected during the previous iterations; and
mapping, using the multi-class linear classifier with the fully-connected network, the respective temporal embedding to each of the possible event types.

7. The computer-implemented method of claim 6, wherein the multi-class linear classifier is trained on a corpus of training audio signals, each training audio signal encoded into a sequence of training temporal embeddings, each training temporal embedding comprising a respective speaker label.

8. The computer-implemented method of claim 1, wherein, during an initial iteration, the previously selected speaker embedding is equal to zero.

9. The computer-implemented method of claim 1, wherein the operations further comprise determining a number N of the multiple speakers based on the number of speaker embeddings previously selected during the iterations prior to the corresponding iteration.

10. The computer-implemented method of claim 1, wherein predicting the respective voice activity indicator for each respective speaker of the multiple speakers at each time step is based on the temporal embedding associated with the corresponding time step, the respective speaker embedding selected for the respective speaker, and the average of each respective speaker embedding selected during the plurality of iterations.

11. The computer-implemented method of claim 1, wherein:
predicting the respective voice activity indicator for each respective speaker of the multiple speakers at each time step comprises using a voice activity detector having parallel first and second fully-connected neural networks;
the first fully-connected neural network of the voice activity detector is configured to project the temporal embedding associated with the corresponding time step; and
the second fully-connected neural network of the voice activity detector is configured to project a concatenation of the respective speaker embedding selected for the respective speaker and all the average of each respective speaker embedding selected during the plurality of iterations.

12. The computer-implemented method of claim 1, wherein a training process trains the voice activity indicator on a corpus of training audio signals, each training audio signal encoded into a sequence of training temporal embeddings, each training temporal embedding comprising a corresponding speaker label.

13. The computer-implemented method of claim 12, wherein the training process comprises a collar-aware training process that removes losses associated with any of the training temporal embeddings that fall inside a radius around speaker turn boundaries.

14. A system comprising
data processing hardware;
memory hardware in communication with the data processing hardware and storing instructions, that when executed by the data processing hardware, cause the data processing hardware to perform operations comprising:
receiving an input audio signal corresponding to utterances spoken by multiple speakers;
encoding the input audio signal into a sequence of T temporal embeddings, each temporal embedding associated with a corresponding time step and representing speech content extracted from the input audio signal at the corresponding time step;
after receiving the input audio signal, during each iteration of a plurality of iterations each corresponding to a respective speaker of the multiple speakers, selecting a respective speaker embedding for the respective speaker of a corresponding iteration by:
receiving a previously selected speaker embedding comprising an average of each respective speaker embedding previously selected during previous iterations;
for each respective temporal embedding in the sequence of T temporal embeddings, determining, based on the previously selected speaker embedding, a probability that the respective temporal embedding includes a presence of voice activity by a single new speaker for which a speaker embedding was not previously selected during any previous iteration;

determining that the probability satisfies a confidence threshold; and based on determining that the probability satisfies the confidence threshold, selecting a respective one of the temporal embeddings from among the sequence of T temporal embeddings as the respective speaker embedding for the respective speaker of the corresponding iteration, the selected respective one of the temporal embeddings associated with the highest probability for the presence of voice activity by the single new speaker not selected during any previous iteration; and at each time step, predicting a respective voice activity indicator for each respective speaker of the multiple speakers based on the respective speaker embeddings selected during the plurality of iterations and the respective temporal embedding associated with the corresponding time step, the respective voice activity indicator indicating whether a voice of the respective speaker is active or inactive at the corresponding time step.

15. The system of claim 14, wherein at least a portion of the utterances in the received input audio signal are overlapping.

16. The system of claim 14, wherein a number of the multiple speakers is unknown when the input audio signal is received.

17. The system of claim 14, wherein the operations further comprise, while encoding the input audio signal, projecting the sequence of T temporal embeddings encoded from the input audio signal to a downsampled embedding space.

18. The system of claim 14, wherein, during each iteration of the plurality of iterations for each respective temporal embedding in the sequence of T temporal embeddings, determining the probability that the respective temporal embedding includes the presence of voice activity by the single new speaker comprises determining a probability distribution of possible event types for the respective temporal embedding, the possible event types comprising:
the presence of voice activity by the single new speaker;
a presence of voice activity for a single previous speaker for which another respective speaker embedding was previously selected for during a previous iteration;
a presence of overlapped speech; and
a presence of silence.

19. The system of claim 18, wherein determining the probability distribution of possible event types for the respective temporal embedding comprises:
receiving, as input to a multi-class linear classifier with a fully-connected network, the respective temporal embedding and the previously selected speaker embedding comprising the average of each respective speaker embedding previously selected during previous iterations; and
mapping, using the multi-class linear classifier with the fully-connected network, the respective temporal embedding to each of the possible event types.

20. The system of claim 19, wherein the multi-class linear classifier is trained on a corpus of training audio signals, each training audio signal encoded into a sequence of training temporal embeddings, each training temporal embedding comprising a respective speaker label.

21. The system of claim 14, wherein, during initial iteration, the previously selected speaker embedding is equal to zero.

22. The system of claim 14, wherein the operations further comprise determining a number N of the multiple speakers based on the number of speaker embeddings previously selected during the iterations prior to the corresponding iteration.

23. The system of claim 14, wherein predicting the respective voice activity indicator for each respective speaker of the multiple speakers at each time step is based on the temporal embedding associated with the corresponding time step, the respective speaker embedding selected for the respective speaker, and the average of each respective speaker embedding selected during the plurality of iterations.

24. The system of claim 14, wherein:
predicting the respective voice activity indicator for each respective speaker of the multiple speakers at each time step comprises using a voice activity detector having parallel first and second fully-connected neural networks;
the first fully-connected neural network of the voice activity detector is configured to project the temporal embedding associated with the corresponding time step; and
the second fully-connected neural network of the voice activity detector is configured to project a concatenation of the respective speaker embedding selected for the respective speaker and the average of each respective speaker embedding selected during the plurality of iterations.

25. The system of claim 14, wherein a training process trains the voice activity indicator on a corpus of training audio signals, each training audio signal encoded into a sequence of training temporal embeddings, each training temporal embedding comprising a corresponding speaker label.

26. The system of claim 25, wherein the training process comprises a collar-aware training process that removes losses associated with any of the training temporal embeddings that fall inside a radius around speaker turn boundaries.

* * * * *